(12) United States Patent
Wan et al.

(10) Patent No.: US 6,292,290 B1
(45) Date of Patent: Sep. 18, 2001

(54) METHODS AND APPARATUS FOR ADJUSTING POWER IN AN OPTICAL SIGNAL, FOR PROVIDING A SEAMLESS OPTICAL RING AND FOR PROVIDING A BIDIRECTIONAL EQUALIZED AMPLIFIER

(75) Inventors: Ping Wai Wan, Kanata; Derrick Anthony John Remedios, Crescent; Kexing Liu, Nepean; Stephen Kieran Adolph, Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/467,776

(22) Filed: Dec. 20, 1999

(51) Int. Cl.[7] .................................................. H01S 3/00
(52) U.S. Cl. ..................................... 359/337.1; 359/124
(58) Field of Search .................................. 359/341, 124, 359/337.1

(56) References Cited

U.S. PATENT DOCUMENTS

| | | | |
|---|---|---|---|
| 4,900,119 | 2/1990 | Hill et al. ........................... | 350/96.15 |
| 5,452,116 * | 9/1995 | Kirkby et al. ....................... | 359/124 |
| 5,513,029 | 4/1996 | Roberts .............................. | 359/177 |
| 5,959,749 | 9/1999 | Danagher et al. ................... | 359/124 |
| 5,978,114 | 11/1999 | Clark et al. ........................ | 359/115 |
| 6,094,296 * | 7/2000 | Kosaka ............................... | 359/341 |

* cited by examiner

Primary Examiner—Mark Hellner (57) ABSTRACT

A method and apparatus for adjusting power in an optical signal are disclosed and a bidirectional equalized amplifier for providing bidirectional equalization, employing the apparatus and method is disclosed. Use of the method and apparatus to form a seamless ring in an optical network is also disclosed. The method of adjusting power involves splitting an input composite signal into respective drop signals in separate wavelength bands and respective pass signals with a splitter. An attenuator attenuates the drop signals to produce attenuated drop signals. A combiner combines the attenuated drop signals to produce a first output composite signal in which the power is equalized.

29 Claims, 8 Drawing Sheets

METHODS AND APPARATUS FOR ADJUSTING POWER IN AN OPTICAL SIGNAL, FOR PROVIDING A SEAMLESS OPTICAL RING AND FOR PROVIDING A BIDIRECTIONAL EQUALIZED AMPLIFIER

FIELD OF THE INVENTION

The present invention relates to signal power adjustment and more particularly to methods and apparatus for adjusting power in an optical signal, for providing a seamless optical ring and for providing a bidirectional equalized amplifier for optical signals.

BACKGROUND OF INVENTION

In fiber optic communications, information is transmitted as optical signals, i.e. pulses of light at a particular wavelength. Using a system called Wavelength Division Multiplexing (WDM), a plurality of such optical signals, or channels, having respective unique optical wavelengths, are multiplexed to form a WDM signal for transmission on a single optical fiber. However, an optical fiber is not a loss free medium and causes attenuation of the WDM signal. Furthermore, the attenuation is not uniform at all wavelengths of light. Signals having relatively short wavelengths, less than 800 nm for example, are heavily attenuated due to Rayleigh scattering, while signals having relatively long wavelengths, greater than 1600 nm for example, are heavily attenuated due to infrared absorption. Between these extremes, there are local attenuation maxima caused by impurities in the fiber, for example. In addition, optical devices such as optical multiplexers and demultiplexers can cause further non-uniforn attenuation over the range of wavelengths used.

To compensate for the non-uniform attenuation caused by the fiber and other optical devices, respective powers of the individual channel signals which form the WDM signal are adjusted relative to one another such that the WDM signal will have an optimal spectrum when it is initially generated. Signals having wavelengths which are subject to relatively high attenuation will be adjusted to have relatively high power, and signals having wavelengths which are subject to relatively low attenuation will be adjusted to have relatively low power As the WDM signal propagates along the fiber and passes through optical devices, however, the non-uniform fiber attenuation will cause the spectrum of the WDM signal to depart from the optimal spectrum.

To counteract fiber and optical device attenuation losses, it is necessary to include optical amplifiers, such as erbium doped fiber amplifiers (EDFAs) for example, at intervals along the fiber to amplify an attenuated WDM signal so that none of the individual channels which form the WDM signal is attenuated below a minimum detectable power. However, the optical amplifiers may not have a uniform gain for all wavelengths of the WDM signal, and may be susceptible to saturation at some wavelengths thereby causing the overall spectrum of the WDM signal to further depart from the optimal spectrum. Failure to restore the optimal spectrum of the WDM signal can reduce the distance between which optical amplifiers can be spaced as the minimum detectable power of a most highly attenuated signal will be reached more quickly than would be the case for a WDM signal having an optimal spectrum.

In some existing optical communications systems, signal or channel power adjustment is provided by placing discrete narrow-band attenuators at intervals in the fibers according to prescribed rules, calculations and trial and error. The attenuators increase the attenuation of less attenuated channels, resulting in a more uniform attenuation over all WDM signals. Effectively, these discrete attenuators serve to make the loss characteristic of the fiber less wavelength dependent. However, this method may require a number of iterations and may require additional adjustment each time the network is expanded or modified.

Another method of providing channel power adjustment involves demultiplexing the WDM signal to separate the plurality of individual channels, individually attenuating each of the channels and remultiplexing the channels to reproduce the WDM signal prior to amplification. However, this method may result in unacceptably high signal losses since an optical demultiplexer typically uses a plurality of optical filters connected in series to separate the channels from the WDM signal. Each filter has an inherent loss, such that channels which must pass through several filters will experience a cumulative loss. If the WDM signal contains a large number of channels, 32 for example, the cumulative filter loss of 32 filters may be significant, reducing the spacing between amplifiers.

An additional need for channel power adjustment arises in the context of optical ring networks or meshed networks. Such networks have redundant paths between nodes, providing greater network reliability but also creating closed loop paths such that with the addition of optical amplifiers positive feedback can occur. Optical noise may accumulate and increase in magnitude with each circuit around the ring, leading to unacceptable signal-to-noise ratios, high bit error rates and, in the extreme case, to lasing and system overload. To prevent such noise accumulation, it is necessary to provide sufficient attenuation to prevent positive feedback from occurring. It has been found that a ring loss of at least 10 dB is necessary to prevent noise accumulation. However, while this amount of loss is desirable for system stability, it may have undesirable effects on signal transmission.

In most prior art optical rings, noise accumulation is prevented by providing a seam which interrupts the flow of optical signals around the ring. Conventionally, this seam is provided by an apparatus at a network node which performs electrical regeneration, by which a received WDM optical signal is demultiplexed, converted to electrical signals, filtered to remove noise and then converted back into a WDM optical signal for retransmission. However, as optical transmission rates increase, it has become difficult to perform the optical-to-electrical-to-optical conversion at sufficiently high speeds.

Therefore, there is a need for an apparatus which Provides variable attenuation of respective optical signals in a WDM signal to achieve an optimal WDM spectrum without causing unacceptable signal losses. There i s a particular need for such an apparatus for use in a seamless optical ring so as to provide selective attenuation representing a low loss path to an in-band WDM signal and representing a high loss path to an out-band noise signal.

SUMMARY OF THE INVENTION

The above problems with the prior art are addressed by the present invention which provides a method and apparatus for adjusting power in an optical signal. Effectively the method and apparatus involve splitting an input composite optical signal into respective drop signals in separate wavelength bands, attenuating the drop signals to produce attenuated drop signals and combining the attenuated drop signals to produce a first output composite optical signal.

In one embodiment, the input composite optical signal is split by producing respective drop signals and respective pass signals. The respective pass signals are cascaded through successive drop signal splitters to accumulate the pass signals into a remainder signal. At the same time, drop signals are produced by respective drop signal splitters and such drop signals are attenuated by separate respective attenuators to produce respective attenuated drop signals.

In one embodiment, splitting Is achieved by filtering respective predecessor pass signals and producing respective pass signals therefrom. filtering may be provided by dielectric interference filters, for example.

Preferably, the attenuation of the respective drop signals is variable and may be set by a control device or manually for example.

The combining of the attenuated drop signals may be achieved by passing the attenuated drop signals through respective cascaded drop signal combiners to successively add the drop signals together to produce the first output composite optical signal. A combined band signal is produced at at least some of the drop signal combiners in response to respective attenuated drop signals and a respective combined band signal from a predecessor drop signal combiner.

Signals which are not in the separate wavelength bands through which attenuation control is provided may be passed to an output to produce a remainder output signal and this remainder output signal may be transmitted to another device of the type described above, for example. The output composite signal provided by such other device may be received at one of the drop signal combiners for combining with attenuated drop signals to produce the composite output signal.

The splitter may be provided with a first input port, a first intermediate port and a reverse transmission path between the first intermediate port and the first input port for transmitting optical signals from the first intermediate port to the first input port while splitting the input composite optical signal received at the first input port.

In accordance with another aspect of the invention, a input equalized amplifier may be implemented by using the apparatus described above in combination with a first amplifier for amplifying the first output composite signal to produce an amplified first output composite signal. A second apparatus, similar to the first apparatus, for adjusting signal power of a second input composite optical signal may be provided The second apparatus preferably has a second intermediate port for receiving the amplified first output composite signal and has a second input port and a reverse transmission path between the second intermediate port and the second input port for communicating the amplified first output composite signal to the second Input port while splitting the second input composite optical signal received at the second input port to produce a second output composite signal.

In accordance with another aspect of the invention, there is provided a seamless optical ring network having a continuous optical path having first and second ports, an apparatus for adjusting signal power in an optical signal on the continuous optical path and an amplifier. The apparatus has a splitter connected to the first port of the continuous optical path for splitting an input composite optical signal carried by the continuous optical path into respective drop signals in separate wavelength bands. The apparatus further includes an attenuator for attenuating the drop signals to produce attenuated drop signals. The apparatus further includes a combiner for combining the attenuated drop signals to produce a first output composite signal. The amplifier is connected to the combiner to receive and amplify the first output composite signal, the amplifier being in communication with the continuous optical path to transmit an amplified first output composite signal thereon.

In accordance with another aspect of the invention input equalization of optical signals may be provided by selectively attenuating and then combining signals in respective wavelength bands of an input composite signal, received at a first input port of a first equalizer to produce a first output composite signal. The first output composite signal may then be amplified to produce an amplified first output composite signal. The amplified first output composite signal may then be passed through a reverse path in a second equalizer to a second input port of the second equalizer for transmission on an optical medium, while selectively attenuating and then combining signals in respective wavelength bands of a second input composite signal received at the second input port of the second equalizer to produce a second output composite signal. The second output composite signal may then be amplified to produce an amplified second output composite signal. The second output composite signal is then passed through a reverse path in the first equalizer, to the first Input port of the first equalizer, for transmission on an optical medium.

The above apparatus allows separate bands of an optical signal to be attenuated such that an optical amplifier having a non-uniform gain with respect to wavelength, can produce a signal having a relatively even distribution of power in each wavelength band. The apparatus also allows for adjustment of attenuation of signals to match gain bandwidth products of an optical amplifier to compensate for noise limitations of low signal levels and to prevent saturation at high signal levels Effectively, the apparatus provides a low loss path to optical signals within predefined wavelength bands. This is achieved by splitting, attenuating and then adding signals within predefined wavelength bands. All other wavelengths outside the bands controlled by the device are attenuated.

The present invention provides for single site power equalization and management. In this regard, an optical spectrum analyzer may be connected to an optical medium and channel powers can be monitored at the output of an amplifier driving the medium, while signals in particular wavelength bands are adjusted to compensate for variations in gain between the bands to provide equal channel powers, or to optimize channel signal to noise ratios. This can be implemented at a single site which provides convenience in tuning an optical network. In addition, apparatus according to the invention can be used to provide a smooth optical seam in an optical network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
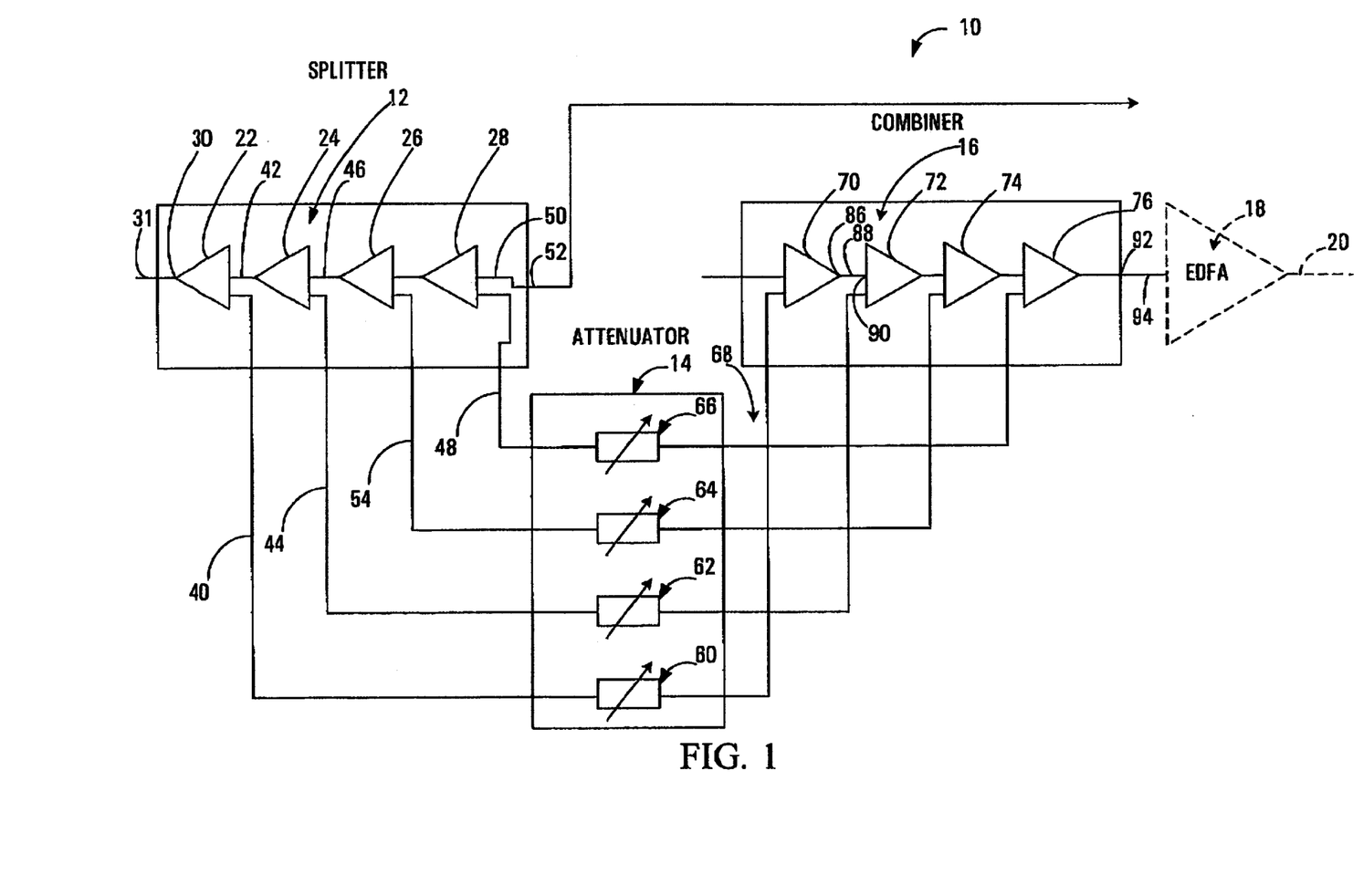
FIG. 1 is a block diagram of an apparatus for adjusting signal power in an optical signal, according to a first embodiment of the invention.

As shown in FIG. 1, an apparatus for adjusting signal power in an optical signal, such as a dense wavelength multiplexed optical signal is shown generally at 10. The apparatus acts as a per-band equalizer. In this embodiment, the apparatus includes a splitter 12 for splitting an input composite optical signal into respective drop signals in separate wavelength bands, an attenuator 14 for attenuating the drop signals to produce attenuated drop signals and a combiner 16 for combing the attenuated drop signals to produce a first output composite signal. The first output composite signal may be provided to an amplifier shown generally at 18 operable to supply an amplified version of the first output composite signal on an optical medium 20 such as an optical fiber in an optical network, for example. The amplifier 18 includes an erbium doped fiber amplifier (EDFA), however; other suitable amplifiers may be substituted.

In this embodiment the splitter 12 includes a plurality of drop signal splitters including first second, third and fourth drop signal splitters 22. 24, 26, and 28 respectively.

Figure 2:
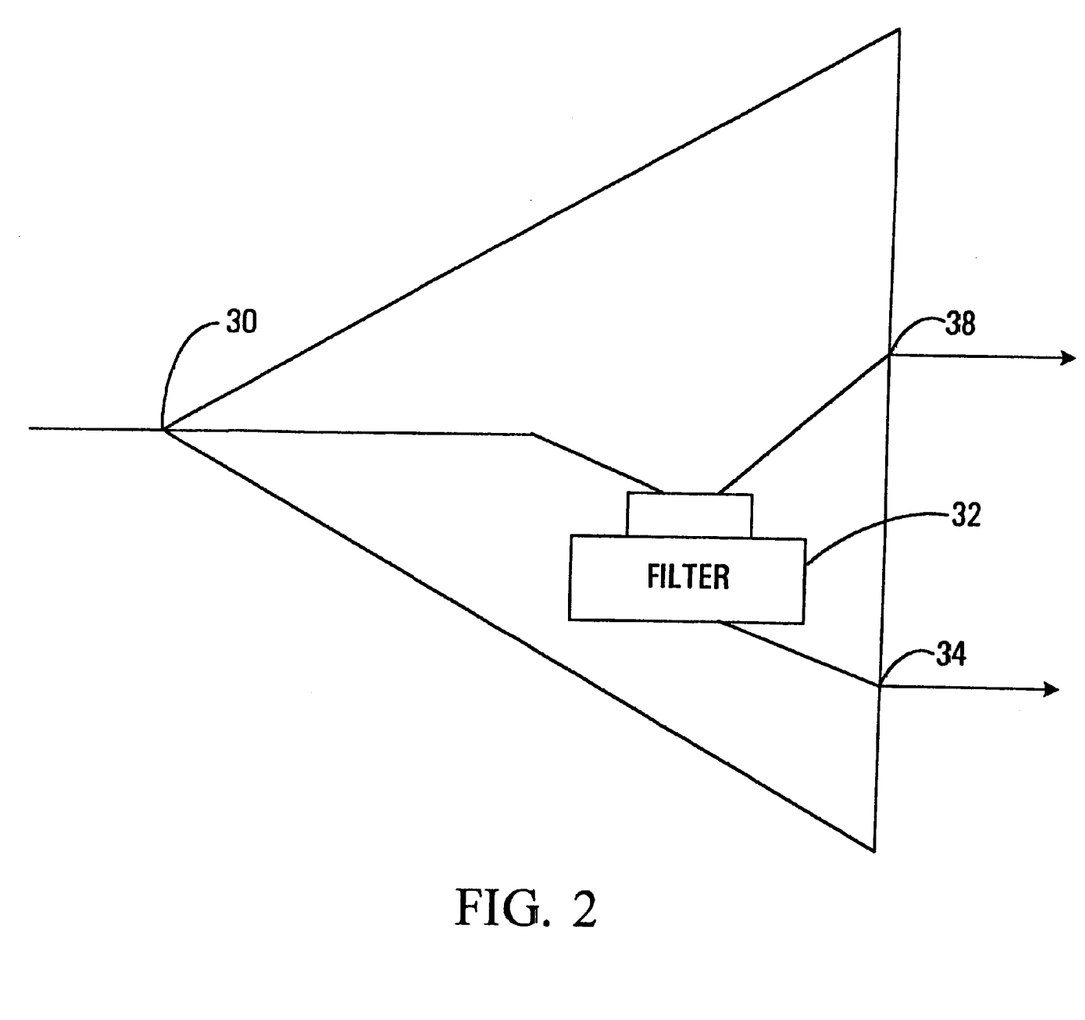
FIG. 2 is a block diagram of a first drop signal splitter of the apparatus shown in FIG. 1.

Referring to FIG. 2, the first drop signal splitter 22 is shown. The first drop signal splitter 22 includes a first input port 30 Referring briefly to FIG. 1, the first input port 30 is in communication with an input 31 of the splitter 12. Referring back to FIG. 2, the first input port 30 is in optical communication with a dielectric interference filter 32 which has a port 34 which provides a first optical drop signal comprised of optical signals having wavelengths within a bandpass range and has a port 38 for providing a pass signal comprised of optical signals having wavelengths which are not within the passband range. In this embodiment, the passband range of the drop first splitter is approximately 1527 nm–1534 nm, for example. Thus, the dielectric interference filter simultaneously acts as both a bandpass filter and a notchband filter. A suitable splitter is manufactured by JDS Filtel Incorporated of Nepean Ontario, Canada and provides an isolation between the ports 30 and 34 of typically 20 db and has a return loss of about –35 db.

Referring back to FIG. 1, each of the drop signal splitters 22, 24, 26, and 28 has its own unique bandpass range in which optical signals are passed. The drop signal splitters are configured in a cascaded arrangement wherein the input composite signal received at the first input port 30 of the first drop signal splitter is split by the first drop signal splitter 22 to produce a first drop signal on a first optical medium 40 and a first pass signal on a first connecting optical medium 42, connected to a input port of the second drop signal splitter 24. The pass signal produced by the first drop signal splitter 22 thus acts as an input signal to the second drop signal splitter 24.

The second drop signal splitter 24 splits the first pass signal to produce a second drop signal on a second optical medium 44 while producing a second pass signal on a second connecting optical medium 46 in communication with an input port of the third drop signal splitter 26. This process of producing respective pass signals at successive drop signal splitters is continued through each of the drop signal splitters to a final drop signal splitter, which in this embodiment is the fourth drop signal splitter 28. The fourth drop signal splitter 28 produces a fourth drop signal on a fourth optical medium 48 and produces a fourth pass signal on a connecting medium 50. The fourth pass signal is provided at a first intermediate port 52 of the splitter which provides the fourth pass signal as a remainder output signal which is essentially is comprised of optical signals having wavelengths not in any of the bands defined by the respective bandpass fitters of the first, second, third and fourth drop signal splitters 22, 24, 26 and 28. The remainder output signal is provided at the first intermediate port 52 for use by another device (not shown in FIG. 1), if necessary.

Attenuator

The first, second and fourth optical media 40, 44 and 48 and a third optical medium 54 in communication with the third drop signal splitter 26, are in communication with the attenuator 14. The attenuator 14 has a respective attenuator for each drop signal and thus includes first, second, third and fourth attenuators 60, 62, 64 and 66 respectively. Each of these attenuators is a variable optical attenuator for providing a variable attenuation to a respective drop signal. The attenuators may be of the type provided in the MV47W series provided by JDS Fitel Incorporated of Nepean Ontario, Canada. These attenuators are manually controlled. The respective attenuators 60, 62, 64 and 66 are connected to further respective optical media shown generally at 68 which carry respective attenuated first, second, third and fourth drop signals to the combiner 16.

In this embodiment, the combiner 16 includes a plurality of cascaded band signal combiners, each operable to produce a combined band signal by combining a combined band signal of a predecessor combiner with a respective attenuated drop signal. In this embodiment, there are four band signal combiners 70, 72, 74 and 76.

Figure 3:
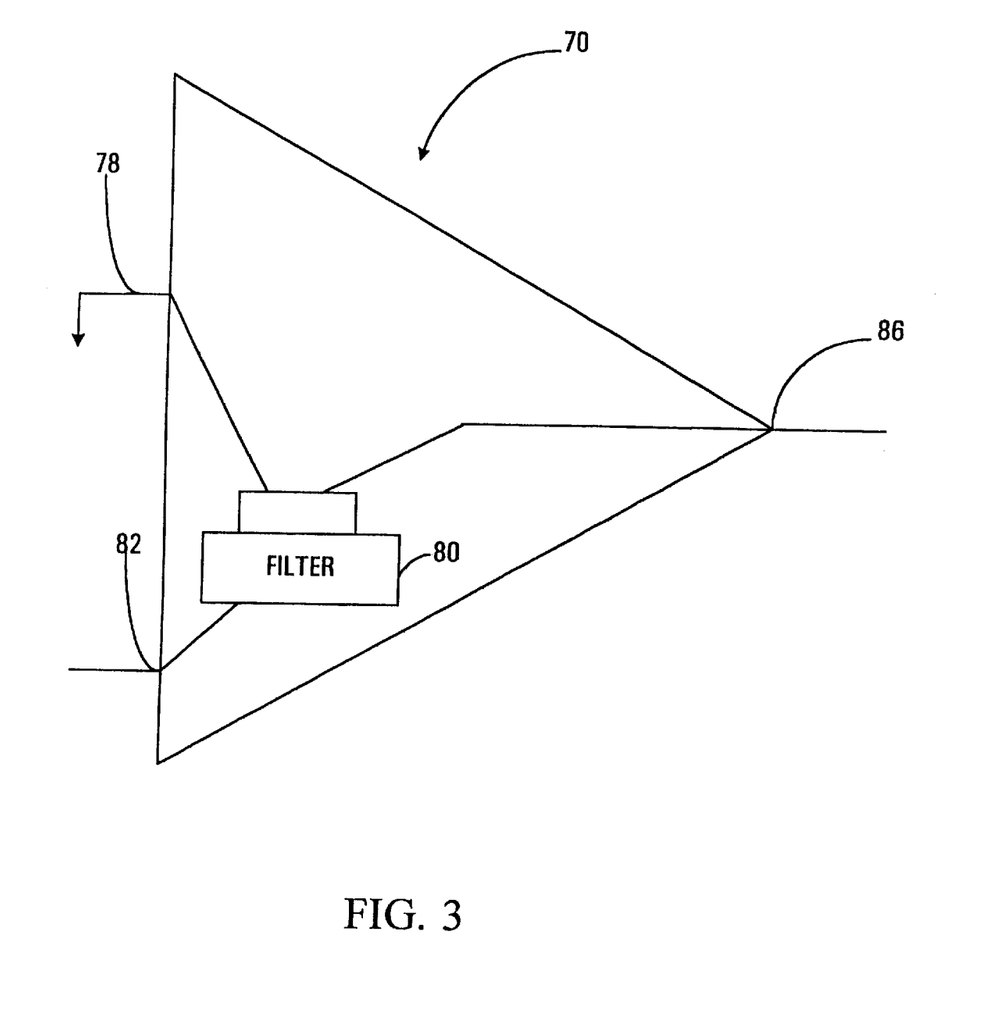
FIG. 3 is a block diagram of a first band signal combiner of the apparatus shown in FIG. 1.

Referring to FIG. 3, the first band signal combiner is shown generally at 70 and has first and second combiner ports 78 and 82. In this embodiment, the first combiner port 78 is simply terminated although it may be connected to another apparatus of a type similar to that described herein for receiving a second output composite signal as will be described further below.

Any optical signal received at the first and second combiner ports 78 and 82 are communicated to a dielectric filter 80 arranged to combine optical signals received at the first combiner port 78 outside a particular wavelength band, with optical signals within the particular wavelength band received at the second combiner port 82. In this embodiment, for the first drop signal combiner, this wavelength band is 1527–1534 nm, for example.

Effectively, at any given band signal combiner the dielectric filter therein passes signals received at the ports 78 and 82 in separate, complementary portions of the optical spectrum to produce a combined signal. The dielectric filter has an output 86 which provides the combined signal. In this embodiment, the dielectric filters used as combiners are the same as the dielectric filters used as the drop splitters described above.

Referring back to FIG. 1, the output 86 of the first band signal combiner 70 is connected by an optical medium 88 to a first port 90 of the second band signal combiner 72 while the optical medium 68 carrying the second attenuated drop signal is provided to a second port thereof. The second band signal combiner produces a second combined band signal which is provided to the third band signal combiner 74. The third band signal combiner provides a third combined band signal to the fourth band signal combiner 76, the output of which acts as a first output port 92 of the apparatus. The combined band signal produced by the fourth band signal combiner 76 acts as the first output composite signal. The first output port 92 is connected by an optical medium 94 to the amplifier 18, which provides an amplified version of the first output composite signal on the optical medium 20.

Effectively, the above apparatus allows independent attenuation of each band, all at one location, to equalize the powers of respective dense wavelength multiplexing optical signals.

Figure 4:
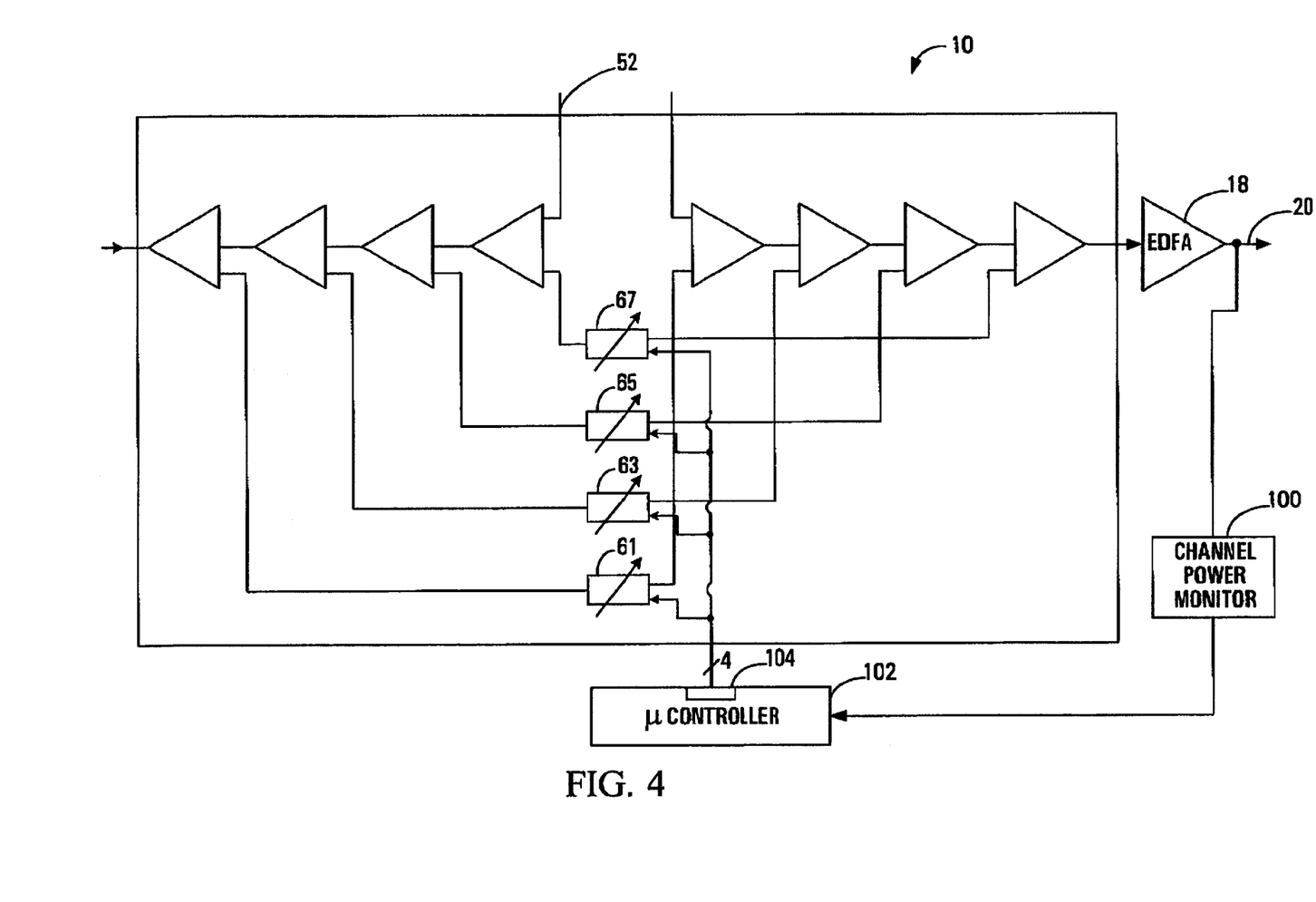
FIG. 4 is a block diagram of a channel power monitoring device and a microcontroller in communication with the apparatus shown in FIG. 1.

As shown in FIG. 4, the apparatus may be used to equalize channel power of optical signals of the input composite signal, on a per-band basis. To select an appropriate attenuation for each band, a channel power monitoring device 100 may be connected to the optical medium 20 driven by the amplifier 18. The channel power monitoring device 100 may be an optical spectrum analyzer for example, which provides signals to a microcontroller 102 programmed to provide signals to an output interface 104 in communication with respective voltage controlled attenuators 61, 63, 65 and 67, for increasing or decreasing attenuation provided by each attenuator to adjust and balance the optical power in each wavelength band controlled by each respective attenuator 60–66.

Figure 5:
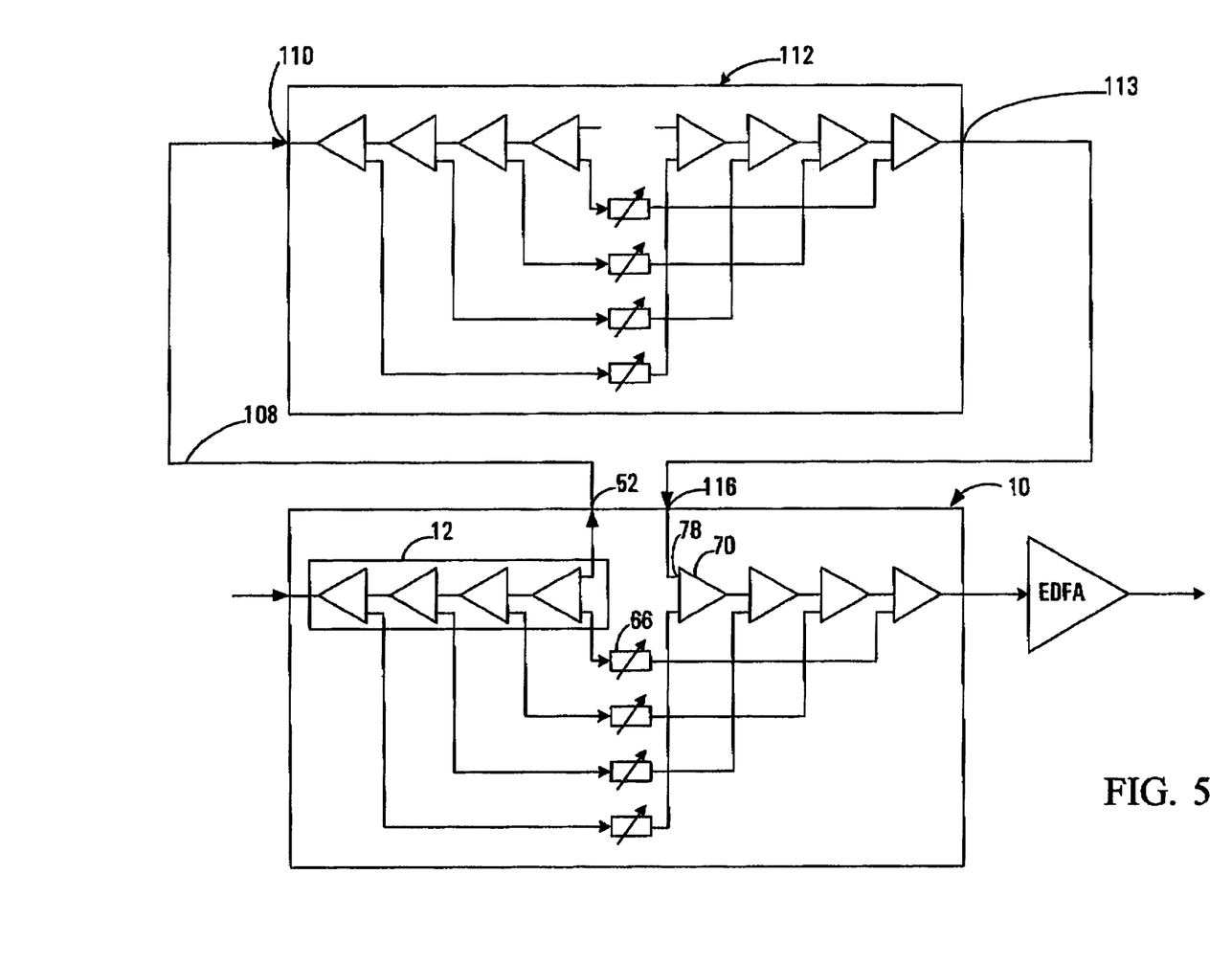
FIG. 5 is a block diagram of two apparatuses of the type shown in FIG. 1 connected together to provide for attenuation of a greater number of wavelength bands.

Referring to FIG. 5, It will be appreciated that multiple equalization apparatuses may be connected together as shown to provide attenuation and control over a greater number of wavelength bands than provided by one equalization device of the type shown in FIG. 1. To do this, the first intermediate port 52 of the splitter 12 of the first apparatus 10 is connected by an optical medium 108 to a port 110 of a second apparatus 112, which is similar to the first apparatus 10, but has passband wavelengths different from those of the first apparatus.

An output 113 of the second apparatus 112 is connected by a further optical medium 114 to communicate a second composite output signal produced at the output 113 to a second port 116 of the first apparatus 10. The second port 116 is in optical communication with the first combiner port 78 of the first band signal combiner 70 which combines the second composite output signal with the first attenuated drop signal produced by the first attenuator 60. Thus, combination of the first and second apparatuses 10 and 112 provides as the first output composite signal, a combination of the attenuated drop signals produced by the first apparatus 10 and the attenuated drop signals comprising the second composite output signal. Consequently, the band resolution of the overall apparatus is increased with this configuration. Also, the ports 52 and 116 provide for easy upgrading or expansion of the number of wavelength bands controlled.

Figure 6:
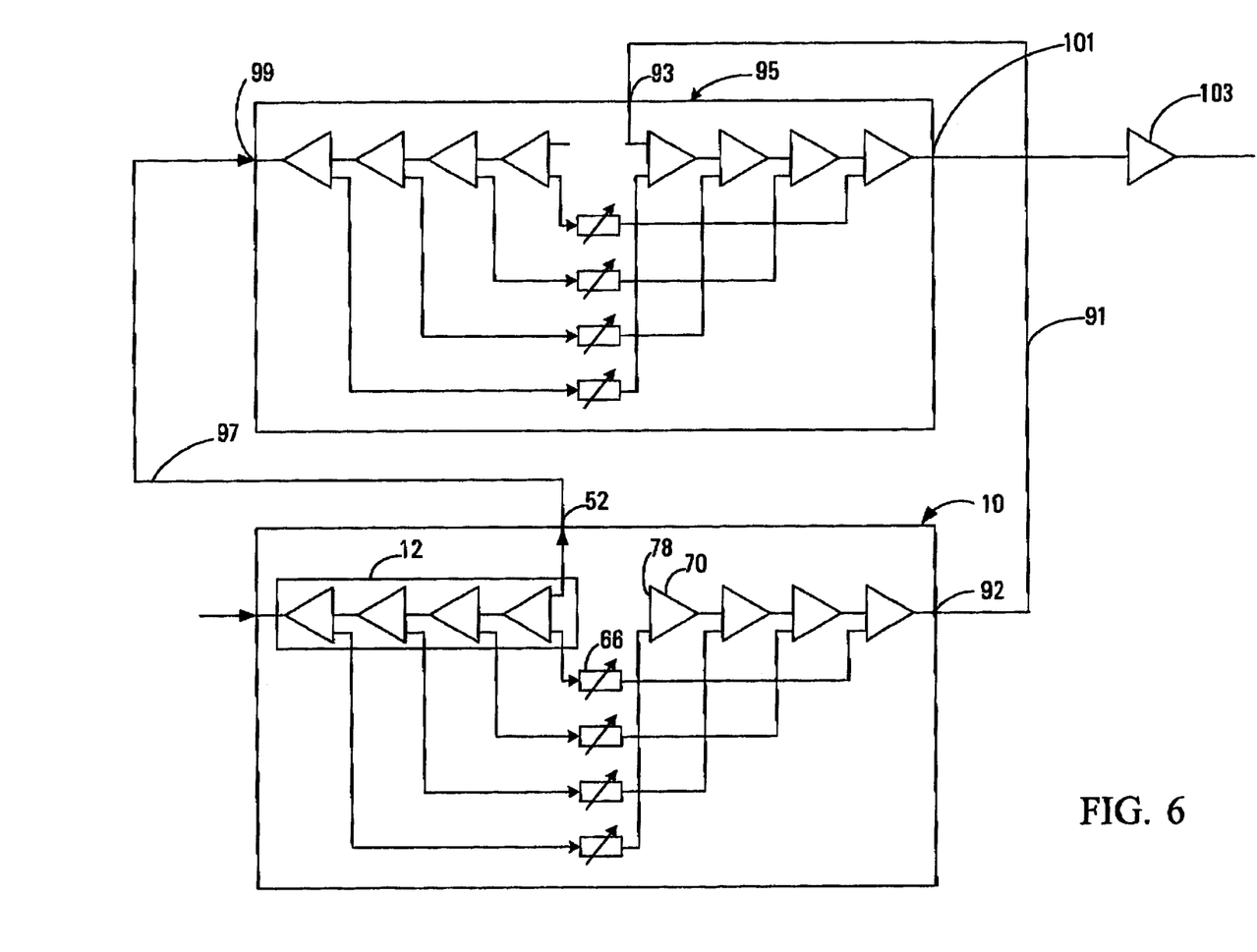
FIG. 6 is a block diagram of a further two apparatuses of the type shown in FIG. 1 connected together in an alternate manner to provide for attenuation of a grater number of wavelength bands.

Alternatively, as shown in FIG. 6, the first composite output signal provided at the output port 92 of the apparatus 10, may be communicated by an optical medium 91 to an upgrade input 93 of a third apparatus 95, while at the same time the optical signal appearing at the intermediate port 52 of the first apparatus is communicated by a further optical medium 97 to an input port 99 of the third apparatus 95. The third apparatus provides a third composite output signal at an output 101 thereof and this third composite optical signal is supplied to an amplifier 103. This configuration presents a more balanced loss to signals in wavelength bands controlled by the first and third apparatus 10 and 95, compared to the loss presented to signals by the apparatus shown in FIG. 5, due to the passband and dropband signals passing through the same number of splitters and combiners, which for this embodiment is 3. In FIG. 5, the passband signal passes through 4 splitters and combiners and the drop band signals pass through two splitters and combiners, and therefore, presents an unbalanced loss to the composite Input signal.

Figure 7:
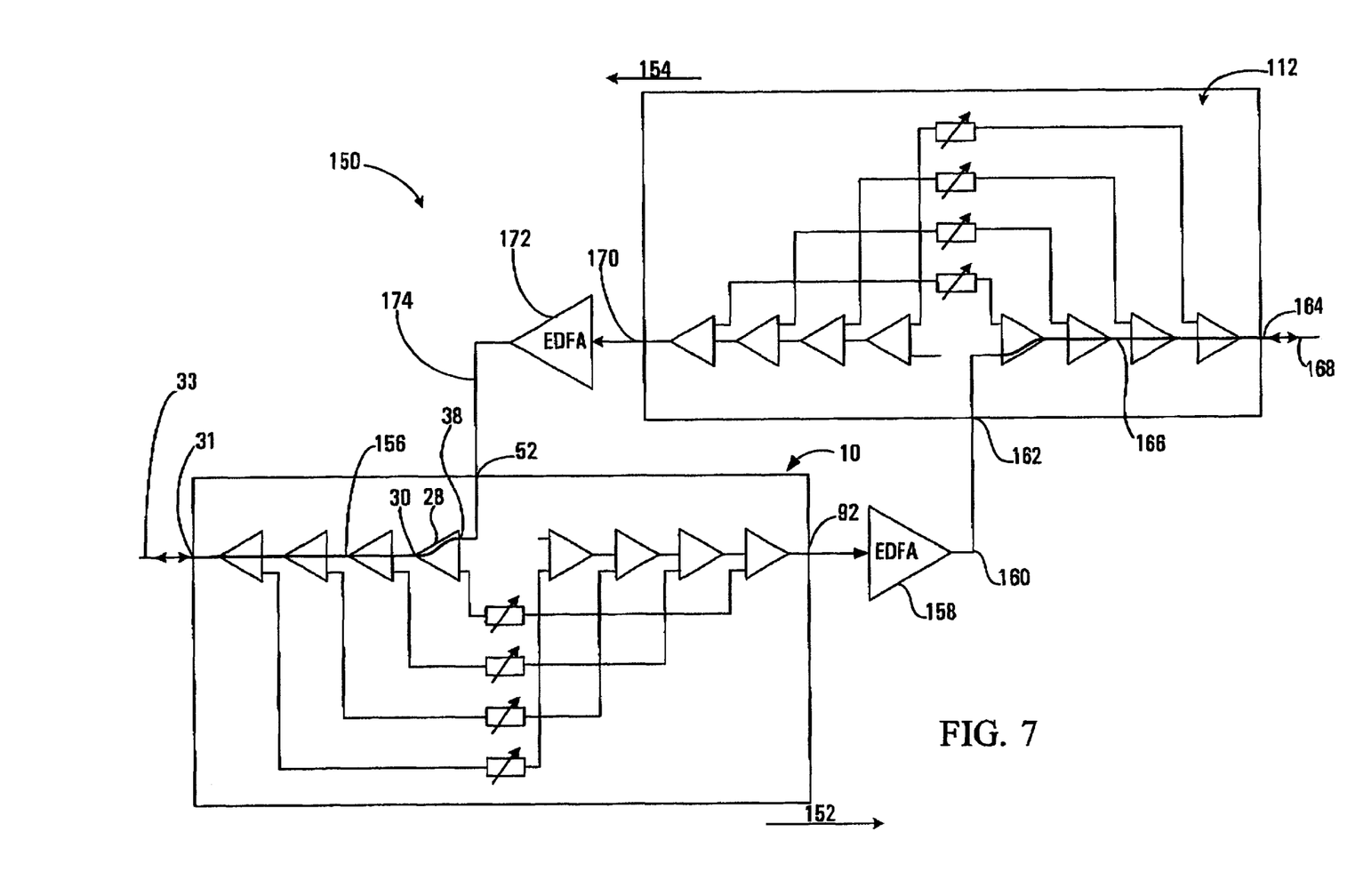
FIG. 7 is a block diagram of an input equalized amplifier employing the apparatus shown in FIG. 1.

Referring to FIG. 7, an input equalized amplifier employing the apparatus described above is shown generally at 150. The input equalized amplifier includes the apparatus 10 and the apparatus 112 described in connection with FIGS. 1 and 5 however these apparatuses are connected oppositely. Effectively, overall configuration provides for amplification and equalization of optical signals having wavelength bands defined by the first apparatus 10, for signals travelling in a first direction 152 and provides for equalization and amplification of signals having wavelength bands defined by the second apparatus and travelling in a second direction 154.

As described above, the first apparatus 10 has the first input port 30, the first output port 92 and has the fist intermediate port 52, which in this embodiment acts as a first Intermediate port. Referring to FIGS. 1 and 7, the first intermediate port 52 is in communication with a port 38 of the fourth drop signal splitter 28. A reverse transmission path is provided between the port 38 and the first input port 30 of the fourth drop signal splitter 28. Each drop signal splitter provides a similar reverse path and thus the apparatus is said to have a reverse transmission path 156 between the first intermediate port 52 and the first input 31 for transmitting optical signals from the first intermediate port 52 to the first input 31 while splitting the input composite optical signal received at the first input 31 from a first optical medium 33 to produce the first output composite signal at the first output port 92.

The first output composite signal is amplified by a first amplifier 158 to produce an amplified first output composite signal on an optical medium 160 in communication with a second intermediate port 162 of the second apparatus 112. The second apparatus also has a second reverse transmission path 166, similar to the first reverse transmission path 156 of the first apparatus 10, for communicating optical signals from the second intermediate port 162 to a second input port 164. Thus, effectively the first input composite optical signal is equalized by the apparatus 10 and amplified by the amplifier 158 and transmitted through the second reverse transmission path 166 to appear at the second input port 164 for transmission on a second optical medium 168.

Second input composite optical signals received on the optical medium 168 are equalized by the second apparatus 112 in a manner similar to that described in connection with the first apparatus 10 to produce a second output composite signal at an output 170 of the second apparatus 112. This second output composite signal Is provided to a second optical amplifier 172 which provides an amplified second composite output signal via an optical medium 174 to the first intermediate port 52 of the first apparatus 10.

Thus, the input equalized amplifier selectively attenuates and then combines signals in respective wavelength bands of the input composite optical signal received at the first input port 30, from a first optical medium 33 to produce a first output composite signal at the first output port 92. This first output composite signal is amplified by the amplifier 158 to produce the amplified first output composite signal. This amplified first output composite signal is then passed through a reverse path in the second apparatus 112, to a second input port of the second apparatus for transmission on a second optical medium 168, while at the same time, the second apparatus selectively attenuates and then combines signals in respective wavelength bands of a second Input composite optical signal received at the second input port 164 of the second apparatus 112 to produce a second output composite signal at the output 170. This second output composite signal is amplified by the second amplifier 172 to produce an amplified second output composite signal on the optical medium 174 which is passed through a reverse path in the first apparatus 10 from the first intermediate port 52 to the first input port 31 of the first equalizer for transmission on a first optical medium 33.

In an alternative embodiment, the apparatus according to the first embodiment of the invention may be placed after the optical amplifier, especially where it is known that the input signal will not cause the optical amplifier to saturate. This reduces the minimum EDFA input power requirement, while the optical signal is still equalized.

Figure 8:
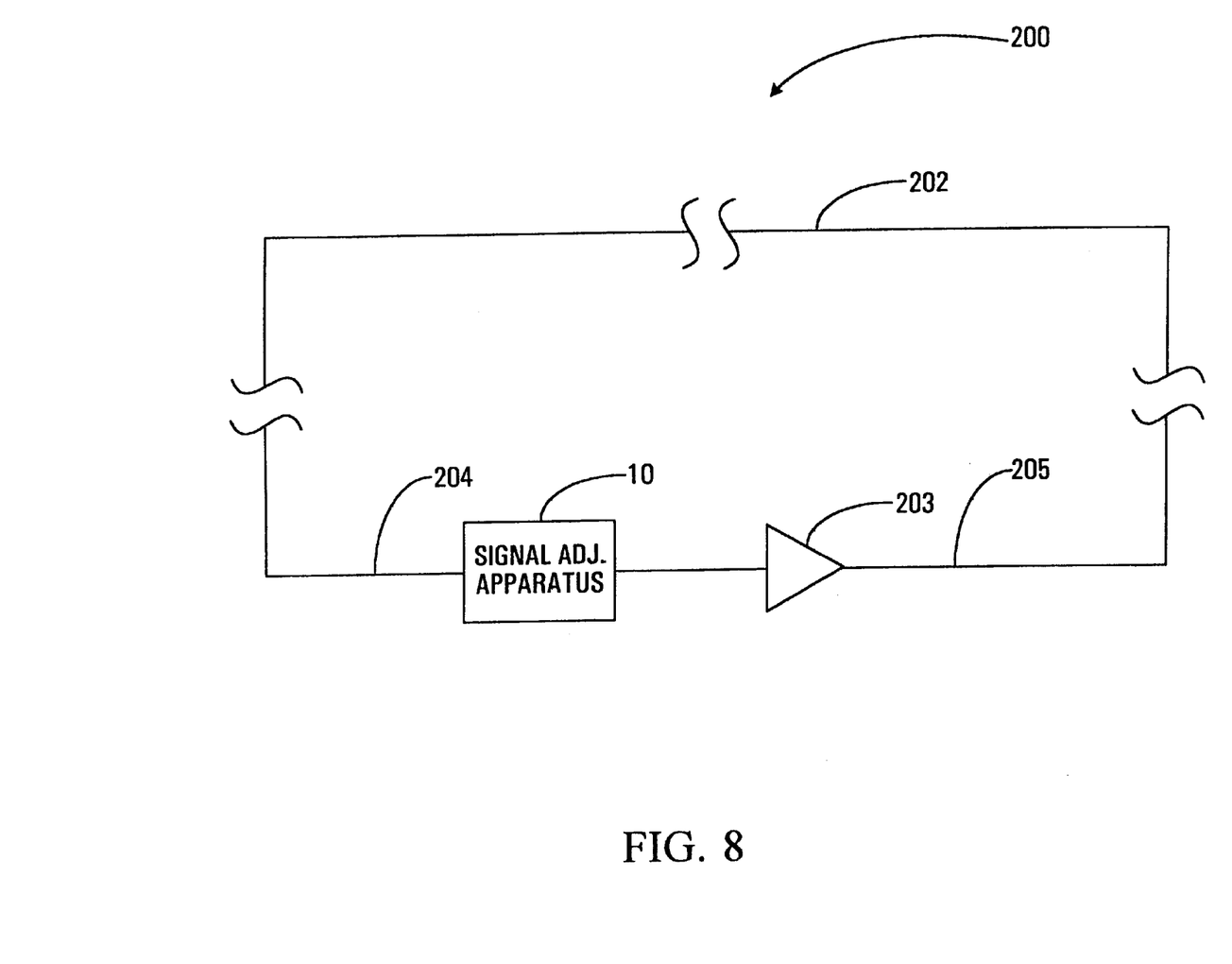
FIG. 8 is a schematic diagram of a seamless ring employing the apparatus shown in FIG. 1.

Referring to FIG. 8, a seamless optical ring network according to a further embodiment of the invention is shown generally at 200. The seamless optical network includes a continuous optical path 202 formed by a fiber or a plurality of fibers connected In series around a metropolitan area, for example. Various optical devices may be connected in the path to amplify or multiplex and demultiplex signals carried by the optical path. The optical path has first and second ports 204 and 205 which are in communication with the apparatus 10 for adjusting signal power, of the type described above and an amplifier 203, respectively. The apparatus provides for attenuation of selected bands of the optical signal to prevent excessive gain which could lead to saturation and lasing in the system due to positive feedback which could otherwise be created by the amplifier 203.

While specific embodiments of the invention have been described and illustrated, such embodiments should be considered illustrative of the invention only and not as limiting the invention as construed In accordance with the accompanying claims.

What is claimed is:

1. A method of adjusting power in an optical signal, the method comprising:
   a) splitting an input composite optical signal into respective drop signals in separate wavelength bands and into respective pass signals;
   b) attenuating said drop signals to produce attenuated drop signals; and
   c) combining said attenuated drop signals to produce a first output composite signal.

2. The method claimed in claim 1 further comprising cascading said respective pass signals through successive drop signal splitters to accumulate said pass signals into a remainder signal while producing said drop signals.

3. The method claimed in claim 2 wherein producing said respective drop signals comprises bandpass filtering respective predecessor pass signals and producing said respective pass signals comprises notch filtering said respective predecessor pass signals.

4. The method claimed in claim 3 wherein bandpass filtering comprises passing said respective predecessor pass signals through a dielectric interference filter.

5. The method claimed in claim 3 wherein notch filtering comprises passing said respective predecessor pass signals through a dielectric interference filter.

6. The method claimed in claim 1 wherein attenuating comprises variably attenuating said respective drop signals.

7. The method claimed in claim 6 wherein combining comprises passing said attenuated drop signals through respective cascaded drop signal combiners to successively add said drop signals together to produce said first composite output signal.

8. The method claimed in claim 7 wherein combining comprises combining a second output composite signal with at least one of said attenuated drop signals.

9. The method claimed in claim 7 wherein combining comprises producing a combined band signal at at least some of said drop signal combiners, in response to a respective attenuated drop signal and a respective combined band signal from a predecessor drop signal combiner.

10. The method claimed in claim 1 further comprising passing signals not in said separate wavelength bands to produce a remainder output signal, transmitting said remainder output signal to an equalizer and combining a second output composite signal from said equalizer with said attenuated drop signals to produce said first composite output signal.

11. The method as claimed in claim 1 further comprising combining a second output composite signal with said attenuated drop signals.

12. The method claimed in claim 11 further comprising producing a remainder output signal comprised of signals having wavelengths not in said separate wavelength bands.

13. The method claimed in claim 1 further comprising transmitting optical signals through a splitter, from a first intermediate port thereof to a first input port thereof while receiving said input composite optical signal at said first input port and while splitting said input composite optical signal.

14. A method of providing input equalization of optical signals, the method comprising:
   a) selectively attenuating and then combining signals in respective wavelength bands of an Input composite optical signal, received at a first input port of a first equalizer, to produce a first output composite signal;
   b) amplifying said first output composite signal to produce an amplified first output composite signal;
   c) passing said amplified first output composite signal through a reverse path in a second equalizer, to a second input port of said second equalizer for transmission on an optical medium, while selectively attenuating and then combining signals in respective wavelength bands of a second input composite optical signal, received at said second input port of said second equalizer, to produce a second output composite signal;
   d) amplifying said second output composite signal to produce an amplified second output composite signal; and
   e) passing said amplified second output composite signal through a reverse path in said first equalizer, to said first input port of said first equalizer for transmission on an optical medium.

15. An apparatus for adjusting signal power in an optical signal, the apparatus comprising:
   a) a splitter for splitting an input composite optical signal into respective drop signals in separate wavelength bands and for splitting the input composite optical signal into respective pass signals in separate wavelength bands;
   b) an attenuator for attenuating said drop signals to produce attenuated drop signals; and
   c) a combiner for combining said attenuated drop signals to produce a first output composite signal.

16. The apparatus claimed in claim 15 wherein said splitter comprises a plurality of cascaded drop signal splitters, each operable to produce a respective drop signal and a respective pass signal, said respective drop signals being provided to said attenuator and said respective pass signals being cascaded to respective successor cascaded drop signal splitters.

17. The apparatus claimed in claim 16 wherein each of said cascaded drop signal splitters comprises a bandpass filter for providing a respective drop signal and a notch band filter for providing a respective pass signal.

18. The apparatus claimed in claim 17 wherein said bandpass filter comprises a dielectric interference filter.

19. The apparatus claimed in claim 17 wherein said notch band filter comprises a dielectric interference filter.

20. The apparatus claimed in claim 15 wherein said attenuator comprises a respective attenuator for each drop signal.

21. The apparatus claimed in claim 20 wherein each of said respective attenuators comprises a variable optical attenuator for providing a variable attenuation to a respective drop signal.

22. The apparatus claimed in claim 15 wherein said combiner comprises a plurality of cascaded band signal combiners, each operable to produce a combined band signal and to combine a combined band signal of a predecessor cascaded band signal combiner with a respective attenuated drop signal.

23. The apparatus claimed in claim 15 wherein said combiner comprises a port for receiving a second output composite signal to be combined with said respective drop signals.

24. The apparatus claimed in claim 23 wherein said splitter is operable to produce a remainder output signal comprised of signals having wavelengths not in said separate wavelength bands.

25. The apparatus claimed in claim 24 wherein said splitter comprises an output for transmitting said remainder output signal to a per band equalizer operable to produce the second output composite signal and wherein said combiner is operable to combine the second output composite signal with said attenuated drop signals to produce said first composite output signal.

26. The apparatus claimed in claim 15 wherein said splitter comprises a first input port, a first intermediate port and a reverse transmission path between said first intermediate port and said first input port, for transmiting optical signals from said first intermediate port to said first input port while splitting said input composite optical signal received at said first input port.

27. A bidirectional equalized amplifier comprising the apparatus as claimed in claim 26 and further comprising:

a) a first amplifier for amplifying said first output composite signal to produce an amplified first output composite signal;

b) a second apparatus for adjusting signal power of a second input composite optical signal, said second apparatus having a second intermediate input for receiving said amplified first output composite signal and having a second input port and a reverse transmission path between said second intermediate input and said second input port for communicating said amplified first output composite signal to said second input port while splitting said second input composite optical signal received at said second input port to produce a second output composite signal; and c) a second amplifier for amplifying said second output composite signal to produce an amplified second output composite signal for receipt at said first intermediate port;

d) whereby signals in respective wavelength bands of said input composite optical signal are selectively attenuated and combined by said first apparatus and then amplified and passed through said second reverse path of said second apparatus to said second input port and signals In respectives wavelength bands of said second input composite optical signal are selectively attenuated and combined by said second apparatus and then amplified and passed through said first reverse path of said first apparatus to said first input port.

28. The apparatus claimed in claim 27, wherein said first and second amplifiers each comprise an Erbium Doped Fiber Amplifier (EDFA).

29. A seamless optical ring network comprising:

a) a continuous optical path having first and second ports;

b) an apparatus for adjusting signal power in an optical signal on said continuous optical path, the apparatus comprising:

i) a splitter, connected to said first port of said continuous optical path, for splitting an input composite optical signal carried by said continuous optical path into respective drop signals in separate wavelength bands and for splitting said input composite optical signal into respective pass signals in separate wavelength bands;

ii) an attenuator for attenuating said drop signals to produce attenuated drop signals; and iii) a combiner for combining said attenuated drop signals to produce a first output composite signal, c) an amplifier connected to said combiner to receive and amplify said output composite signal, said amplifier being in communication with said second port of said continuous optical path to transmit an amplified first output composite signal thereon.

* * * * *